United States Patent [19]

Roos

[11] 4,335,384
[45] Jun. 15, 1982

[54] LOGARITHMIC AMPLIFIER CALIBRATION MEANS

[75] Inventor: John C. Roos, Thousand Oaks, Calif.

[73] Assignee: Bunker Ramo Corporation, Oak Brook, Ill.

[21] Appl. No.: 110,892

[22] Filed: Jan. 10, 1980

[51] Int. Cl.³ .............................................. G01S 5/02
[52] U.S. Cl. ......................................... 343/114; 330/2
[58] Field of Search ........................ 328/145; 364/571; 330/2; 324/77 F; 343/114, 119

[56] References Cited

U.S. PATENT DOCUMENTS 3,735,410 5/1973 Poppe et al. ........................ 343/114

Primary Examiner—Theodore M. Blum
Attorney, Agent, or Firm—Arthur Freilich; Frederick M. Arbuckle

[57] ABSTRACT

A logarithmic amplifier calibrator having a signal generator providing an exponentially decaying calibration signal and a pulse generator providing a sample pulse each time the calibration signal has decayed by a predetermined decibel (db) increment. More specifically, the calibrator includes a crystal which is excited to an energy level through a feedback loop having an amplification means whose gain is controlled by a voltage controlled attenuator. The decay characteristics of the crystal when installed in the calibrator are determined so that the time required for the crystal to decay over an entire calibration range is known. This time is then divided into a plurality of time increments, each time increment corresponding to a predetermined db drop in the calibration signal. Sample pulses derived from a high frequency, high stability oscillator in the calibrator are developed to correspond to each of the predetermined time increments. The calibration signal is amplified by a logarithmic amplifier to be calibrated, and its output values at the time of each sample pulse provides a plurality of calibration points which can be utilized by a computer to compensate for non-theoretical operation of the logarithmic amplifier. In another application of the invention, the calibrator is utilized in conjunction with an amplitude comparison direction finding receiving system having two receiving channels each of which contains a logarithmic amplifier. During a calibration sequence, the exponentially decaying calibration signal is provided simultaneously to both of the logarithmic amplifiers, and the sample pulses are used to simultaneously clock analog-to-digital converters associated with each of the logarithmic amplifiers. Thus, a means is provided whereby both of the logarithmic amplifiers are calibrated with respect to each other, therefore providing a means for compensating for amplifier mismatch, one of the largest contributors to amplitude error budgets in this type of direction finding system.

14 Claims, 6 Drawing Figures

LOGARITHMIC AMPLIFIER CALIBRATION MEANS

BACKGROUND OF THE INVENTION

The invention relates to calibrators for rf receiving systems and specifically to a calibrator for a logarithmic amplifier.

Logarithmic amplifiers are frequently utilized in rf receiving systems in which it is important to determine input signal levels over a large dynamic range or to determine relative power level changes in an input signal. A typical system utilizing logarithmic amplifiers is an amplitude comparison, direction finding system wherein two receiving channels are utilized, the difference in signal level in each channel being related to the direction of an incoming signal with respect to a reference direction. The direction finding accuracy of this type of system depends upon both channels being closely matched so that amplitude distortion in one channel with respect to the other channel during the amplification process is minimized. One of the largest contributors to error budgets for these types of systems is in the logarithmic amplification portion of each channel. Thus, it is important that each logarithmic amplifier be calibrated with respect to the other logarithmic amplifier so that signal level differences can be accurately determined. Conventional systems have utilized several schemes to effect this calibration. One has been to simultaneously provide a plurality of calibration signals to each of the logarithmic amplifiers, each calibration signal corresponding to a predetermined signal level, and to measure the output signal of each amplifier. A difficulty with this scheme has been in developing precisely known calibration signals in order to obtain a calibration curve having closely spaced calibration points. For most applications, it is desirable to have at least six calibration points for each 10 db change in input signal level. This requires that calibration signals having 2 db increments be developed, these signals having a total dynamic range that could typically be as large as 70 db. The cost of providing these calibration signals to the accuracy required is high, and test equipment of this type must be calibrated frequently.

Another scheme utilized by conventional systems for calibrating logarithmic amplifiers utilizes an exponentially decaying calibration signal from a high Q resonator which drops a predetermined number of decibels in a predetermined time. This calibration scheme requires an accurate adjustment of the Q of the resonator developing the exponentially decaying calibration signal in order to obtain the predetermined decibel drop in the predetermined time. The adjustment usually requires the use of precision resistors and requires considerable time to make. The present invention solves both of the above problems by eliminating the need for developing a plurality of calibration signal each separated by a predetermined db increment, or the need for providing an exponentially decaying calibration signal which will drop by a predetermined number of decibels in a predetermined time.

SUMMARY OF THE INVENTION

The present invention provides a logarithmic amplifier calibration method and means. The calibration means include a means for generating an exponentially decaying calibration signal and a means for generating a sample pulse each time the calibration signal decays by a predetermined decibel increment.

In the specific embodiment of the invention, a crystal having a high Q is utilized for generating the exponentially decaying calibration signal. Prior to utilizing the calibration means, the time required for the calibration signal to exponentially decay by a predetermined number of decibels defining a calibration range is precisely determined, this time being the same regardless of the signal level from which the decay is initiated. No attempt is made to adjust the Q of the crystal and thus the time of decay for this calibration range. Once having established a precise decay time, a plurality of sample pulses are generated so that a time between each sample pulse corresponds to a predetermined db increment, the predetermined db increment being determined by the number of calibration points desired. Having established the time between sample pulses, a high stability oscillator is provided in the calibrator so that its output frequency can be used to generate the sample pulses. The output signal of the logarithmic amplifier to be calibrated is provided to an analog-to-digital converter and, during a calibration sequence, the sample pulses are used to clock the analog-to-digital converter. Thus, the analog-to-digital converter provides a plurality of digital output signals, each signal pair of which corresponds to the predetermined db increment. If an absolute calibration is desired, then the calibrator of the invention can be configured so that each calibration cycle or sequence begins with the crystal providing a calibration signal having a predetermined value.

In a specific application of the invention, an amplitude comparison direction finding receiving system having two receiving channels is configured so that logarithmic amplifiers contained in each channel are simultaneously calibrated by the exponentially decaying calibration signal. Analog-to-digital converters associated with each of the logarithmic amplifiers are simultaneously clocked by the sample pulses, thereby providing for each channel an accurate calibration of the logarithmic amplifier output signal as a function of its input signal. A computer can then develop calibration curves from this information so that, in operation, signals from the two logarithmic amplifiers can be accurately correlated with respect to each other.

DETAILED DESCRIPTION

Detailed illustrative embodiments of the invention disclosed herein exemplify the invention and are currently considered to be the best embodiments for such purposes. However, it is to be recognized that other means could be utilized for generating an exponentially decaying calibration signal and for generating sample pulses at predetermined db increments during the calibration signal decay. Accordingly, the specific embodiments disclosed are only representative in providing a basis for the claims which define the scope of the present invention.

As previously explained, the invention provides a logarithmic amplifier calibrator which incorporates a means for generating an exponentially decaying calibration signal which is to be provided to the input of a logarithmic amplifier. The calibrator also incorporates a means for generating sample pulses at predetermined db increments of the exponentially decaying calibration signal. The sample pulses are then provided to an analog-to-digital converter which has the output of the logarithmic amplifier as an input. Thus, the analog-to-digital converter provides a plurality of output signals each occurring at two db increments, these signals providing a calibration curve for the logarithmic amplifier being tested.

Figure 1:
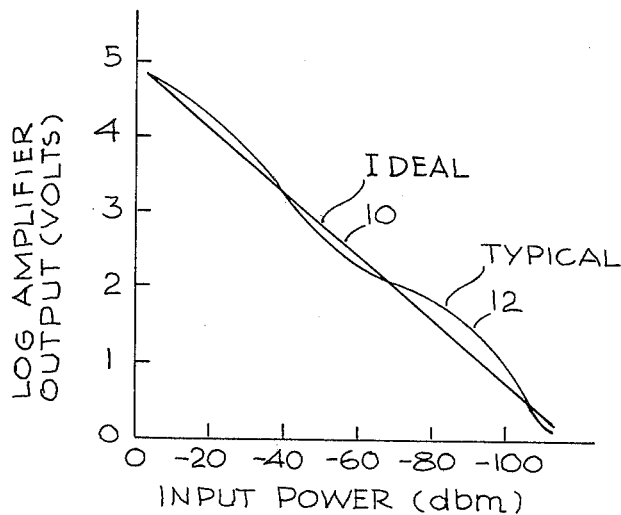
FIG. 1 is a graph showing the theoretical output of a logarithmic amplifier, and the output of a typical logarithmic amplifier, both as a function of input signal level.

Referring to FIG. 1, an ideal or theoretical logarithmic amplifier provides an output voltage 10 which is linear with respect to input voltage or power when measured in decibels or dbm. However, perfect linearity is seldom achieved, and a typical logarithmic amplifier will have an output voltage 12 which is non-linear with respect to input power in dbm. The invention provides a calibrator by which the degree of non-linearity of a logarithmic amplifier can be quantitatively determined.

Figure 2:
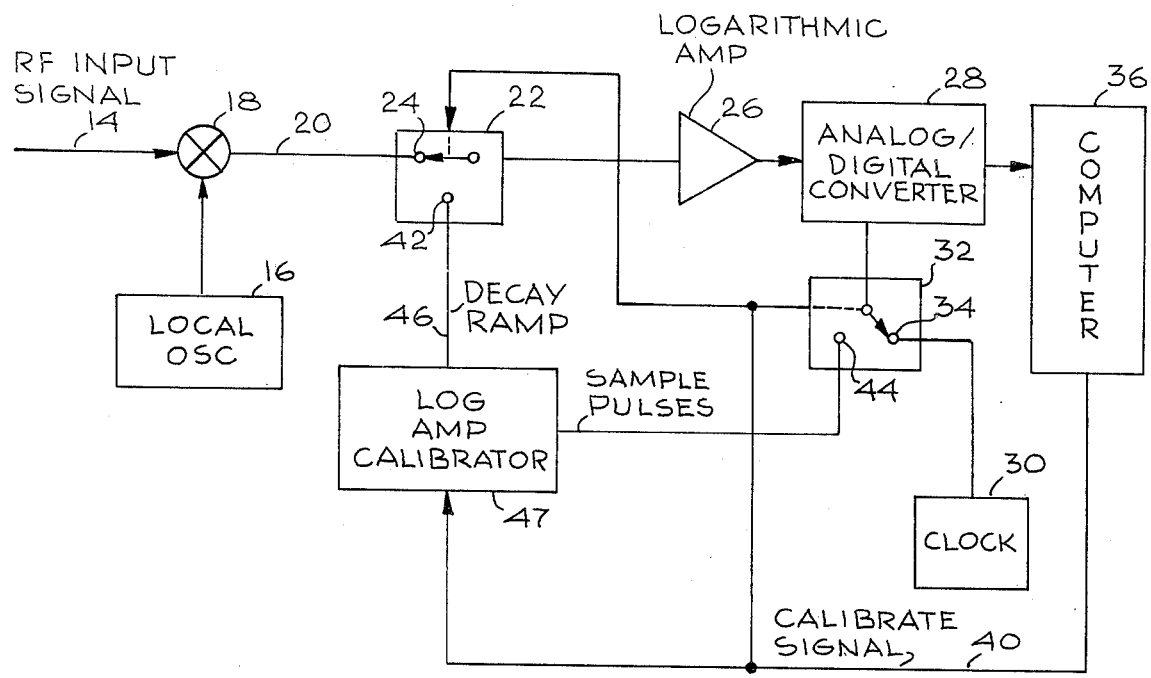
FIG. 2 is a block diagram showing a logarithmic amplifier calibrator provided by the invention and its interfaces to a logarithmic amplifier to be calibrated.

Referring now to FIG. 2, an rf input signal 14 and the output of a local oscillator 16 are provided to a mixer 18, the output of which defines an IF signal 20 having a power or voltage fluctuation to be accurately determined. Under operating conditions, the IF signal 20 is provided through a first switch 22 which is configured so that its output is connected to a first contact 24. It should be appreciated that although a mechanical switch 22 is shown, a FET switch or any other type of electronic switch could also be utilized. The IF signal 20 is thus provided directly to the input of a logarithmic amplifier 26 to be calibrated. An analog-to-digital converter 28 is clocked by a clock pulse generator 30 through a second switch 32 when connected to a first position 34. A digital output from the analog-to-digital converter 28 is provided to a computer 36 for processing.

Figure 3:
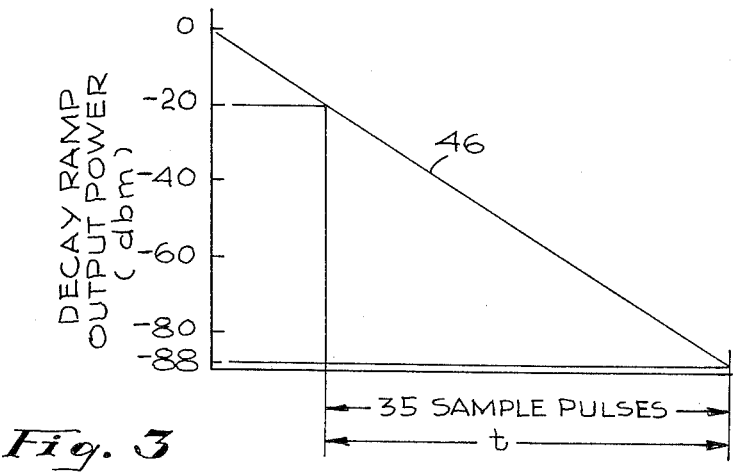
FIG. 3 is a graph showing the division of an exponentially decaying calibration signal into 34 two-db increments.

When it is desired to calibrate the logarithmic amplifier 26, the computer 36 generates a dc or high calibrate signal 40 which configures the first switch 22 to a second position 42 and the second switch 32 to a second position 44. In a manner to be explained below, the calibrate signal 40 also initiates an exponentially decaying calibration signal 46 from a logarithmic amplifier calibrator 47 provided by the invention. The calibrator 47 also generates a plurality of sample pulses each of which corresponds to a 2 db drop in the exponentially decaying calibration signal 46. Referring to FIG. 3, and in a manner to be explained below, the exponentially decaying calibration signal 46 is measured to determine the length of time t required for the calibration signal 46 to drop 68 db, the 68 db defining a predetermined calibration range. As is well understood by those familiar with exponential decay, regardless of the level of the signal at the beginning of the decay, the decay rate in db per unit time will remain constant. Thus, by measuring the time t corresponding to a 68 db decay, the timing between 35 equally spaced sample pulses defining 34 two db increments can be easily calculated. Referring again to FIG. 2, the two db sample pulses are provided as clock pulses to the analog-to-digital converter 28. During a calibration cycle, the computer 36 receives 35 input values from the analog-to-digital converter 28, each input value being 2 db below a preceding input value. If the exponential decay of the calibration signal 46 begins at a predetermined value, then the logarithmic amplifier 26 can be calibrated in terms of actual input signal level. However, if the precise value of the calibration signal 46 at the initiation of the decay is not known, then the calibration relates to signal level changes rather than specific input signal levels. Although the particular implementation shown utilizes an analog-to-digital converter 28, the computer 36 could effect this function, and the logarithmic amplifier 26 analog output signal and the sample pulses could be provided directly to the computer 36. The computer 36 could then determine the value of the logarithmic amplifier 26 output signal corresponding to the occurrence time of each of the sample pulses.

Figure 4:
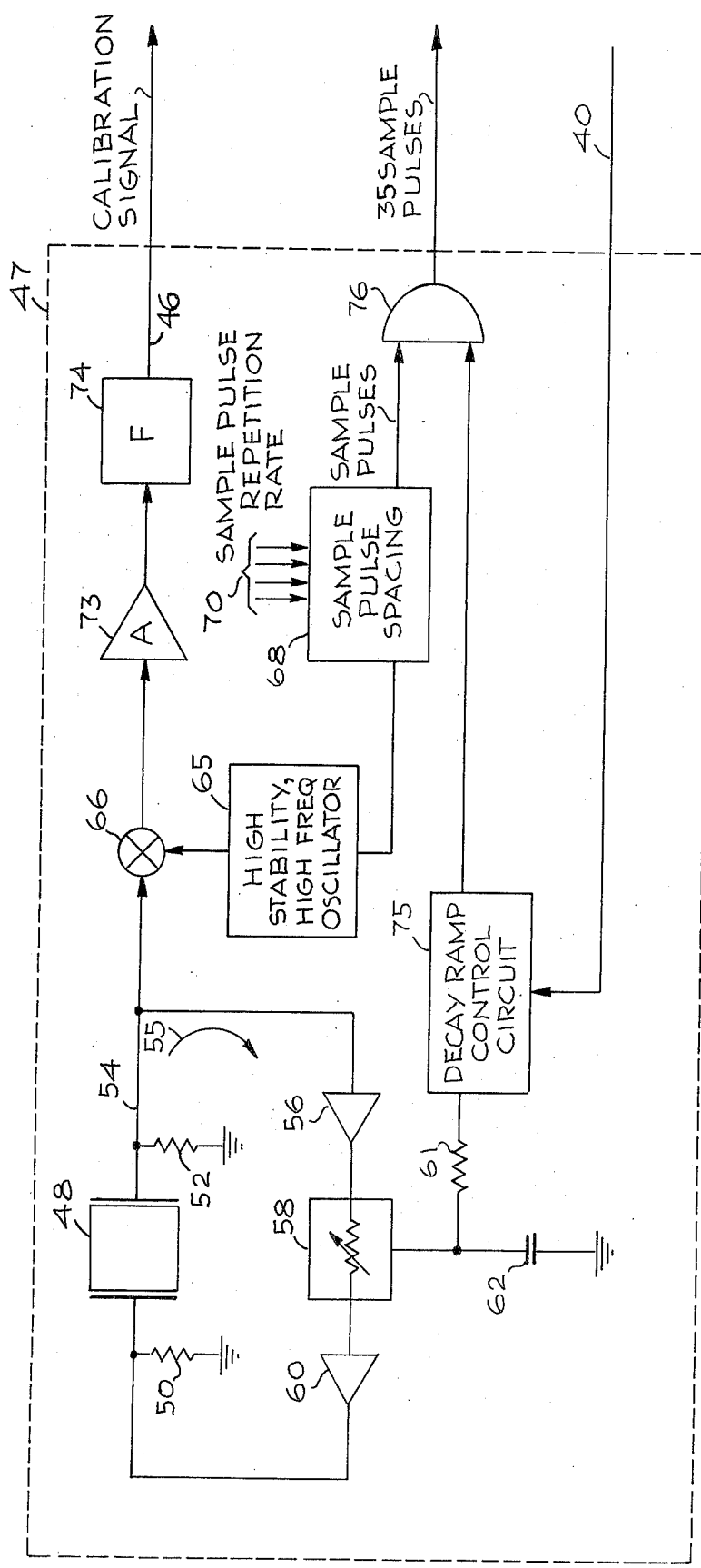
FIG. 4 is a block and schematic diagram of a calibrator provided by the invention.

Referring now to FIG. 4, details of the logarithmic amplifier calibrator 47 are shown. A crystal oscillator 48 is shown, the crystal oscillator being a high Q resonator which has a natural property of having a true exponential decay output signal after it is excited and then permitted to decay. A first and second precision resistor 50 and 52 are provided to control the Q of the crystal oscillator 48 which in turn controls the decay rate. However, as previously explained, the decay rate of the crystal oscillator 48 is not particularly important, nor is the level at which decay begins. However, in order to accurately generate the sample pulses, it is essential that the time of decay for the calibration range be known with precision. This time must be predetermined as previously explained. A feedback loop 55 from the crystal oscillator output 54 is provided through a first amplifier 56, a voltage controlled attenuator 58, and a second amplifier 60. It has been found that spurious resonances can sometimes be generated by crystal oscillators if a feedback loop as above described is suddenly broken. Thus, an RC circuit including a resistor 61 and capacitor 62 are provided in order to insure that the gain of the feedback loop 55 is reduced in a controlled manner. A relatively high stability, high frequency oscillator 65 provides output signals to a mixer 66 and to a sample pulse spacing circuit 68 which has a plurality of counter inputs 70 which can count a predetermined number of cyclical signals from the oscillator 65 to define a sample pulse repetition rate. The output from the mixer 66 is amplified by an amplifier 73 and filtered by a filter 74. The filter 74 output is supplied to the logarithmic amplifier 26 shown in FIG. 2. The calibrate signal 40 from the computer 36 is provided to a decay ramp control circuit 75 which applies a predetermined voltage to the resistor 61, thereby resulting in an attenuation increase in the voltage controlled attenuator 58 in accordance with the time constant of the resistor 61/capacitor 62 combination. It is this time constant that determines the gain change in the feedback loop 55. In addition, the decay ramp control circuit 75 enables an AND gate 76 so that sample pulses can be provided to the analog-to-digital converter 28. The calibrate signal 40 from the computer remains high until 35 sample pulses have been generated. At this time, the calibrate signal 40 becomes low, thereby allowing the charge on the capacitor 62 to discharge through the resistor 61. This discharge lowers the attenuation of the voltage controlled attenuator 58 and increases the gain of the feedback loop 55. In addition, when the calibrate signal 40 goes low, the AND gate 76 blocks sample pulses from reaching the analog-to-digital converter 28.

Prior to using the calibrator 47 provided by the invention, a test set is utilized to precisely determine the time required for a predetermined decibel drop in the output value of the crystal 48 when the feedback loop 55 is broken. This time is then divided into a plurality of equal time increments each corresponding to a predetermined decibel drop increment in the calibration signal 46. Knowing the frequency of the oscillator 64 output signal, the counter inputs 70 are set so that there is a predetermined time increment between each sample pulse, this time increment corresponding to the predetermined decibel drop increment in the calibration signal 46. This method of calibration eliminates the necessity to adjust the Q of the crystal through use of the precision loading resistors 50 and 52 in order to control the time of a desired decibel decay. In a specific application of the invention, the high frequency oscillator 65 is chosen to have an output frequency of 143 megahertz. The crystal oscillator is chosen to have a natural frequency of 17 megahertz. These two signals when applied to the mixer 66 provide as one mixing product an output signal having an output frequency of 160 megahertz which in turn is applied to the logarithmic amplifier 26 shown in FIG. 1 as the calibration signal 46. The 143 megahertz oscillator 65 output is also provided to the sample pulse spacing circuit 68. In a specific embodiment, it is desired to divide a 68 db decay into 34 increments so that each db increment will correspond to 2 db. Thus, it is necessary to generate 35 sample pulses, the time between each sample pulse corresponding to a 2 db drop in the output of the 17 megahertz crystal. Since a 143 megahertz oscillator 65 was chosen, it may be necessary to divide its output in the sample pulse spacing circuit 68 before actually choosing the number of cycles to be counted between sample pulses.

Figure 5:
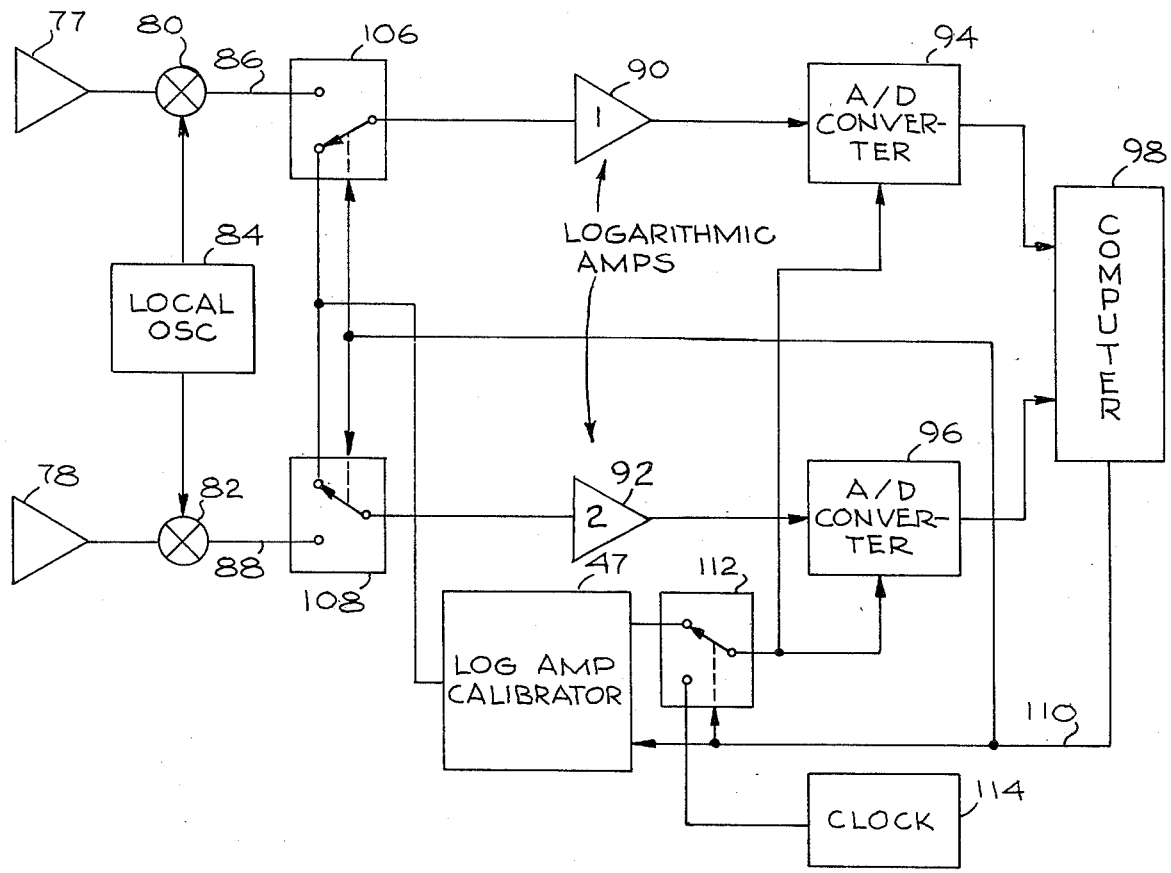
FIG. 5 is a block diagram showing interfaces between a logarithmic amplifier calibrator provided by the invention and an amplitude comparison, direction finding receiving system.
Figure 6:
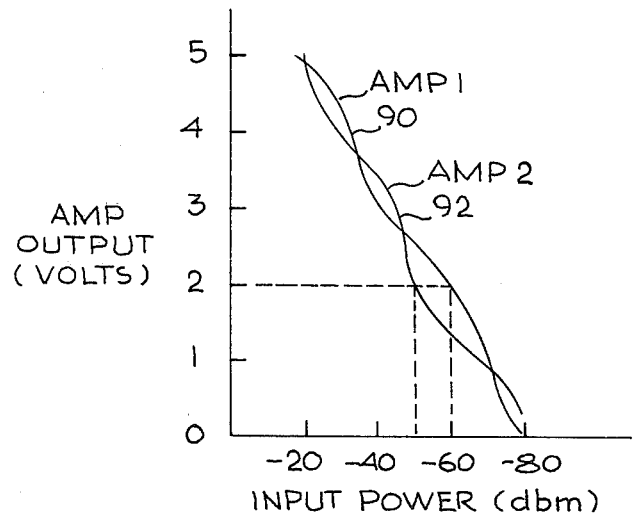
FIG. 6 is a graph showing typical output voltages as a function of input signal level to matched logarithmic amplifiers.

The invention is particularly useful in calibrating an amplitude comparison, direction finding receiving system in which the signal power level of one channel with respect to the signal power level of the other channel is particularly important. In such a system is not essential that the power levels in each channel be known, but rather it is essential that the level in one channel with respect to the level in the other channel be known in order to determine the direction of the incoming signal with respect to a reference direction. A typical amplitude comparison direction finding receiving system is shown in FIG. 5. A first receiver 77 and a second receiver 78 provide rf signals to first and second mixers 80 and 82. A local oscillator 84 provides a mixing signal to both mixers 80 and 82 so that first and second IF signals 86 and 88, respectively, are generated. In operation, these two signals 86 and 88 are supplied to a first logarithmic amplifier 90 and a second logarithmic amplifier 92 which are connected to corresponding first and second analog-to-digital converters 94 and 96. The output signals from the analog-to-digital converters 94 and 96 are provided to a computer 98 which then calculates the direction of the incoming signal. Errors in the above-described system are largely due to mismatched components in each channel which result in an amplitude mismatch of the two signals provided to the computer 98. It is desired in these direction finding systems to match all of the components within each channel so that the first channel including of the receiver 77, mixer 80, amplifier 90 and analog-to-digital converter 94, and the second channel including of the receiver 78, mixer 82, amplifier 92, analog-to-digital converter 96 provide equal output signal to the computer 98 when their input signals are equal. One of the major contributors to error budgets of amplitude comparison, direction finding systems is the logarithmic amplifiers. This type of mismatch is shown in FIG. 6 wherein the first amplifier 90 has one curve of voltage output vs input power and the second amplifier 92 has another. Thus, it can be seen for a given amplitude output voltage, for example 2 volts, the second amplifier 92 would indicate that the input power level was −50 dbm whereas the first amplifier 90 would indicate that it was −60 dbm. A calibrator as provided by the invention provides a means whereby the effects of this amplifier mismatch can be eliminated without having to precisely match the amplification characteristics of the two amplifiers 90 and 92.

Referring now to FIG. 5, the logarithmic amplifier calibrator 47 as described in conjunction with FIG. 4 is utilized. A first and second switch 106 and 108 connect a single output from the calibrator 47 to both of the logarithmic amplifiers 90 and 92. A third switch 112 is provided which under operating conditions connects a clock generator 114 to the first and second analog-to-digital converters 94 and 96, respectively. A calibrate signal 110 from the computer 98, configures the third switch 112 so that sample pulses from the calibrator 47 are provided to the analog-to-digital converters 94 and 96 for the same purpose as explained in conjunction with the FIG. 2 embodiment. Thus, the calibrator 47 provided by the invention, when used in conjunction with an amplitude comparison direction finding system, provides a means whereby the computer 98 can derive the curves shown in FIG. 6, thereby providing a means for accurately adjusting each of the output signals from the logarithmic amplifiers 90 and 92 to compensate for any inherent non-linearities and for enhancing overall system accuracy.

I claim:

1. In an amplitude comparison, direction finding receiving system having at least two channels, each channel of which includes a receiver and an associated logarithmic amplifier, a calibration means for said logarithmic amplifiers comprising:

first means for generating an exponentially decaying calibration signal;

second means for generating a plurality of sample pulses each separated by a time increment corresponding to a predetermined db change in said calibration signal;

means for connecting said calibration signal to said logarithmic amplifiers; and means for determining the output of each of said logarithmic amplifiers at the time of each of said sample pulses, thereby providing a plurality of calibration points for each of said logarithmic amplifiers.

2. The calibration means of claim 1 wherein each of said channels further includes an analog-to-digital converter connected to the output of its associated logarithmic amplifier, said means for determining comprises means for clocking each of said analog-to-digital converters by said sample pulses.

3. The calibration means of claim 2 wherein said first means for generating comprises:
   a high Q resonator;
   an amplification means for amplifying the output of said resonator and providing said amplified output as an input signal to said resonator; and
   means for reducing the gain of said amplification means to initiate an exponential decay of said resonator output signal.

4. THe calibration means of claim 3 wherein said high Q resonator comprises a crystal.

5. The calibration means of claim 3 wherein said second means for generating comprises:
   an oscillator means having a cyclical output signal; and
   means for generating a sample pulse each time a predetermined number of oscillator cyclical output signals have occurred.

6. A method for calibrating a logarithmic amplifier comprising the steps of:
   generating an exponentially decaying calibration signal;
   generating a plurality of sample pulses each occurring when said calibrated signal has decayed by a predetermined db increment;
   amplifying said calibration signal by said logarithmic amplifier; and
   determining an output value of said logarithmic amplifier each time one of said sample pulses is generated, said output values comprising a plurality of calibration points each separated from an adjacent calibration point by said predetermined db increment.

7. A calibration means for a logarithmic amplifier comprising:
   first means for generating an exponentially decaying calibration signal; and
   second means for generating a sample pulse each time said calibration signal decays by a predetermined db increment whereby said calibration signal comprises an input signal to said logarithmic amplifier to be calibrated and said logarithmic amplifier output signal values at the time of each sample pulse comprise a plurality of calibration points each separated by said predetermined db increment.

8. The calibration means of claim 7 wherein said first means for generating comprises:
   a high Q resonator;
   means for exciting said resonator to an energy level; and
   means of initiating said exponentially decaying calibration signal from said excited energy level.

9. The calibration means of claim 8 wherein said high Q resonator comprises a crystal.

10. The calibration means of claim 8 wherein said means for initiating comprises a voltage-controlled attenuator for interrupting said means for exciting.

11. The calibration means of claim 10 wherein said second means for generating comprises:
    a signal generator for providing a plurality of timing signals; and
    means for providing one of said sample pulses after a predetermined number of said timing signals.

12. The calibration means of claim 11 further comprising:
    a computer controlled AND gate;
    means for providing said sample pulses to said AND gate; and
    means for providing a calibrate signal from said computer to said AND gate whereby said AND gate is enabled to pass a predetermined number of sample pulses.

13. The calibration means of claim 9 wherein said means for exciting comprises:
    an amplification means; and
    means for connecting said amplification means in series with a feedback line connecting said crystal output terminal and said crystal input terminal, thereby allowing said crystal to be excited to an energy level determined by said amplification means.

14. The calibration means of claim 11 wherein said signal generator is a high stability oscillator, further comprising means for mixing said oscillator output signal and said high Q resonator output signal, thereby providing a second exponentially decaying calibration signal at a frequency different from that of said high Q resonator.

* * * * *